(12) United States Patent
Skowronek et al.

(10) Patent No.: US 8,662,401 B2
(45) Date of Patent: Mar. 4, 2014

(54) MOBILE PAYMENT ADOPTION BY ADDING A DEDICATED PAYMENT BUTTON TO MOBILE DEVICE FORM FACTORS

(75) Inventors: Dan Skowronek, Parker, CO (US); Theodore VanDeburg, Denver, CO (US); Sarah Owen, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 861 days.

(21) Appl. No.: 12/179,760

(22) Filed: Jul. 25, 2008

(65) Prior Publication Data

US 2010/0023449 A1    Jan. 28, 2010

(51) Int. Cl.
*G06K 19/06* (2006.01)

(52) U.S. Cl.
USPC ........... 235/492; 235/380; 235/382; 455/41.1

(58) Field of Classification Search
USPC ......................................... 235/380, 451, 492
See application file for complete search history.

(56) References Cited

U.S. PATENT DOCUMENTS

| | | | | |
|---|---|---|---|---|
| 2006/0000900 A1* | 1/2006 | Fernandes et al. | ............ | 235/380 |
| 2006/0213972 A1* | 9/2006 | Kelley et al. | ................. | 235/380 |
| 2006/0287004 A1 | 12/2006 | Fuqua | | |
| 2008/0116264 A1 | 5/2008 | Hammad et al. | | |
| 2008/0188178 A1* | 8/2008 | Maugars et al. | ............. | 455/41.1 |
| 2009/0075592 A1* | 3/2009 | Nystrom et al. | ............. | 455/41.1 |
| 2009/0150704 A1* | 6/2009 | Van Bosch | ................... | 713/340 |

FOREIGN PATENT DOCUMENTS

| | | |
|---|---|---|
| KR | 10-2005-0089657 A | 9/2005 |
| KR | 10-0823678 B1 | 4/2008 |
| WO | WO 2007003978 A1 * | 1/2007 |
| WO | WO 2007068993 A1 * | 6/2007 |

OTHER PUBLICATIONS

PCT International Search Report and Written Opinion mailed Mar. 23, 2010; International Application No. PCT/US2009/051283, 11 pages.
MasterCard Worldwide webpage, "MasterCard PayPass: How to Tap", obtained Jul. 13, 2009 online at: http://www.mastercard.com/us/personal/en/aboutourcards/paypass/how_to_tap.html, 1994-2009, 1 page.
MasterCard Worldwide webpage, "MasterCard PayPass FAQs", obtained Jul. 13, 2009 online at: http://www.mastercard.com/us/personal/en/aboutourcards/paypass/faqs.html, 1994-2009, 4 pages.

* cited by examiner

*Primary Examiner* — Christopher Stanford
(74) *Attorney, Agent, or Firm* — Kilpatrick Townsend & Stockton LLP (57) ABSTRACT

Embodiments presented herein generally relate to a novel mobile device containing a near field communication (NFC) component. In embodiments, the mobile device includes a payment user interface device. The payment user interface device may be a button on a keypad or may be an icon on a user interface. In embodiments, only after activating, by depressing or selecting, the payment user interface device can allow a user to use the NFC component. In embodiments, the NFC component is powered off until the activation of the payment user interface device.

11 Claims, 7 Drawing Sheets

MOBILE PAYMENT ADOPTION BY ADDING A DEDICATED PAYMENT BUTTON TO MOBILE DEVICE FORM FACTORS

BACKGROUND

Consumers are now able to pay for merchandise or services using near field communication (NFC) devices. Generally, the NFC devices allow the consumer to pass the NFC device over a sensor and complete an electronic payment automatically. An example of the NFC device is the MasterCard Pay-Pass™.

Unfortunately, at least some of these NFC devices are susceptible to security problems. The NFC devices generally interface with the sensors automatically. As such, the NFC device passes sensitive information, such as a credit card number, to the point-of-sale device automatically. It is possible that a nefarious person with the correct equipment may spoof the NFC device to have the NFC device pass sensitive information unknowingly and at a discreet distance to the device holder.

It is in light of these and other considerations that the present application is being presented.

BRIEF SUMMARY

Embodiments presented herein generally relate to a novel mobile device containing a near field communication (NFC) component. In embodiments, the mobile device includes a payment user interface device. The payment user interface device may be a button on a keypad or may be an icon on a user interface. In embodiments, only after activating, by depressing or selecting, the payment user interface device can allow a user to use the NFC component. In embodiments, the NFC component is power off until the activation of the payment user interface device.

This summary is not meant to limit the claims in any manner. Rather, this summary provides only a few of the possible embodiments. And these embodiments are not meant to define the scope of the application, but, rather, the claims attached hereto define the invention.

BRIEF DESCRIPTION OF THE DRAWINGS

The embodiments of the present disclosure are described in conjunction with the appended figures.

DETAILED DESCRIPTION

Embodiments presented herein relate to a mobile device having a novel user interface device to complete payment of a transaction using the mobile device. In embodiments, a payment button on the mobile device is actuated to start a mobile wallet application and activate a near field communication (NFC) component. The mobile wallet application completes the transaction through the NFC component. Without actuating the payment button, the mobile device, in embodiments, is prevented from transferring information using the NFC component.

Figure 1:
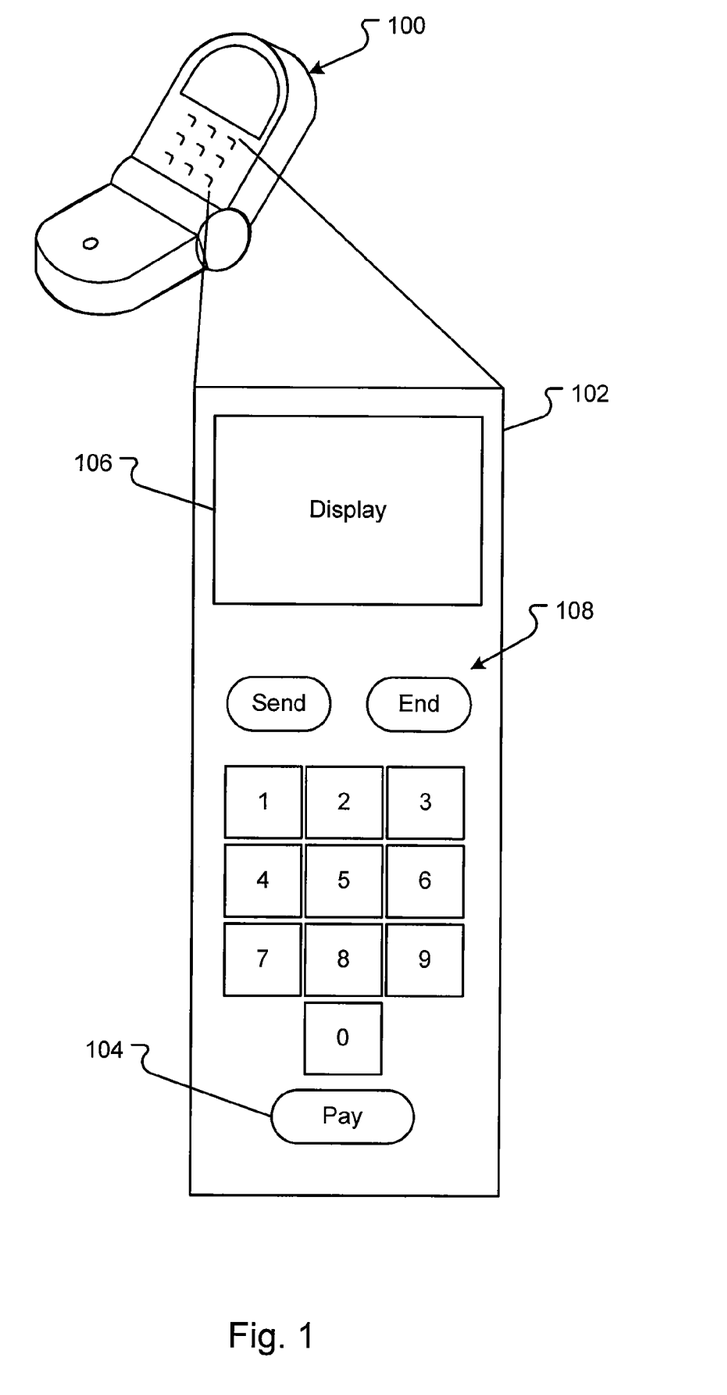
FIG. 1 is a diagram of an embodiment of a mobile device having a payment user interface device.

An embodiment of a mobile device 100 having a payment button 104 is shown in FIG. 1. The mobile device 100, in embodiments, is a device for communicating information to and from the mobile device and/or user. Examples of mobile devices can include cell phones, personal digital assistants, laptop computers, etc. In embodiments, the mobile device 100 comprises an NFC component for communicating with NFC payment sensors and a user interface 102.

The mobile device user interface 102, in embodiments, includes one or more user interface devices that display information to the user on one or more displays 106 and/or receives selections from a user on one or more user interface selection devices 108. In embodiments, the user interface devices 108 are icons or other images presented on a display that allow the user to select the devices using a touch-screen display. For example, the user interface of the iphone® offered by Apple Inc. In alternative embodiments, the user interface devices 108 are physical buttons or keys on a keypad, for example, the numbered keys on the keypad of a mobile phone.

The payment button or payment user interface device 104 can be one or more user interface devices. The user can select the payment user interface device 104 to complete a transaction using an NFC component. Thus, the payment user interface device 104 provides the user control over when the NFC component is used or transfers information.

Figure 2:
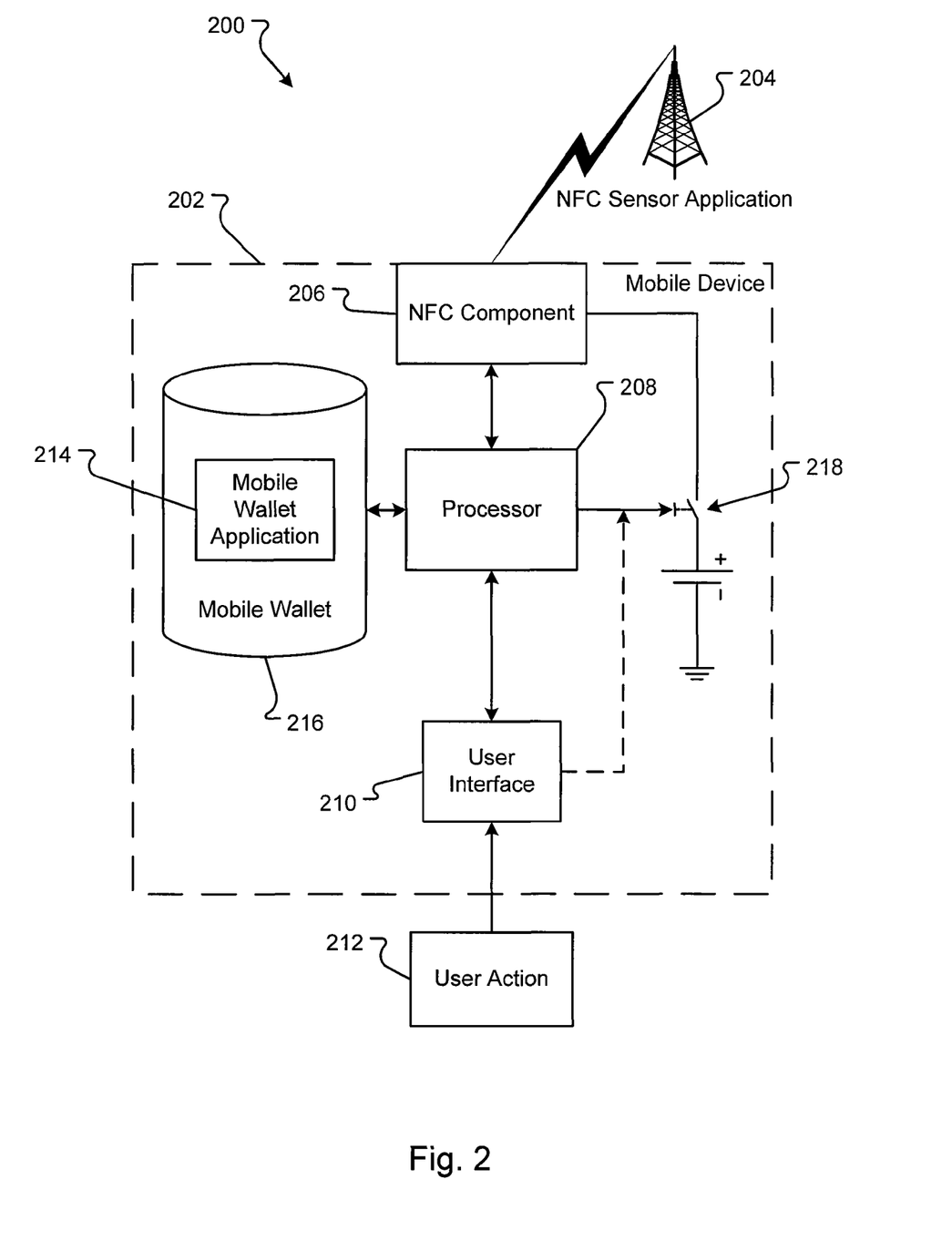
FIG. 2 is a block diagram of an embodiment of a hardware system for a mobile device comprising a payment user interface device.

An embodiment of the hardware of a mobile device 202 having a payment user interface device 104 (FIG. 1) is shown in FIG. 2. In embodiments, the mobile device 202 communicates in a retail environment 200 with an NFC sensor application 204. The NFC sensor application 204 can be a radio frequency identification device (RFID) or other type device that can send and receive information associated with a transaction. For example, the NFC sensor application 204 can be the Felica contactless smart card platform offered by Sony®.

In embodiments, the mobile device 202 includes an NFC component 206. The NFC component 206 may be any circuit or device for communicating with the NFC sensor application 204. For example, the NFC component 206 can be the PN531 transmission module offered by NXP Semiconductors, Eindhoven, Netherlands. In embodiments, the NFC component 206 is an active device that is only powered by activating a switch 218. The switch 218 may be a physical switch, as shown in FIG. 2, or another type of switch to control the powering of the NFC component 206. In embodiments, the mobile device 202 is brought into proximity with the NFC sensor application 204 to communicatively couple the NFC component 206 and the NFC sensor application 204. Proximity may be defined by the NFC system being used and is known in the art.

The mobile device 202 can also include a processor 208. The processor 208 is any processor or circuit, either in hardware, software, or hardware and software, that controls the functions of the mobile device 202. For example, the processor 208 is an Intel PXA800F cellular processor. The processor 208 communicates with the NFC component 206. In embodiments, components communicate with each other through the exchange of information either through a wired medium or a wireless interface. One skilled in the art will recognize methods of facilitating communications between components, such as circuit connections.

In embodiments, the mobile device 202 also includes a user interface 210. The user interface 210 comprises any hardware or software operable to present information to a user on a display of the mobile device 202 or receive selections of user interface devices by the user. The user interface 210 can communicate with the processor 208 to send signals indicative of selections of user interface devices to the processor 208. In embodiments, the processor 208 can create signals to be rendered by the user interface 210 on a display.

Figure 6:
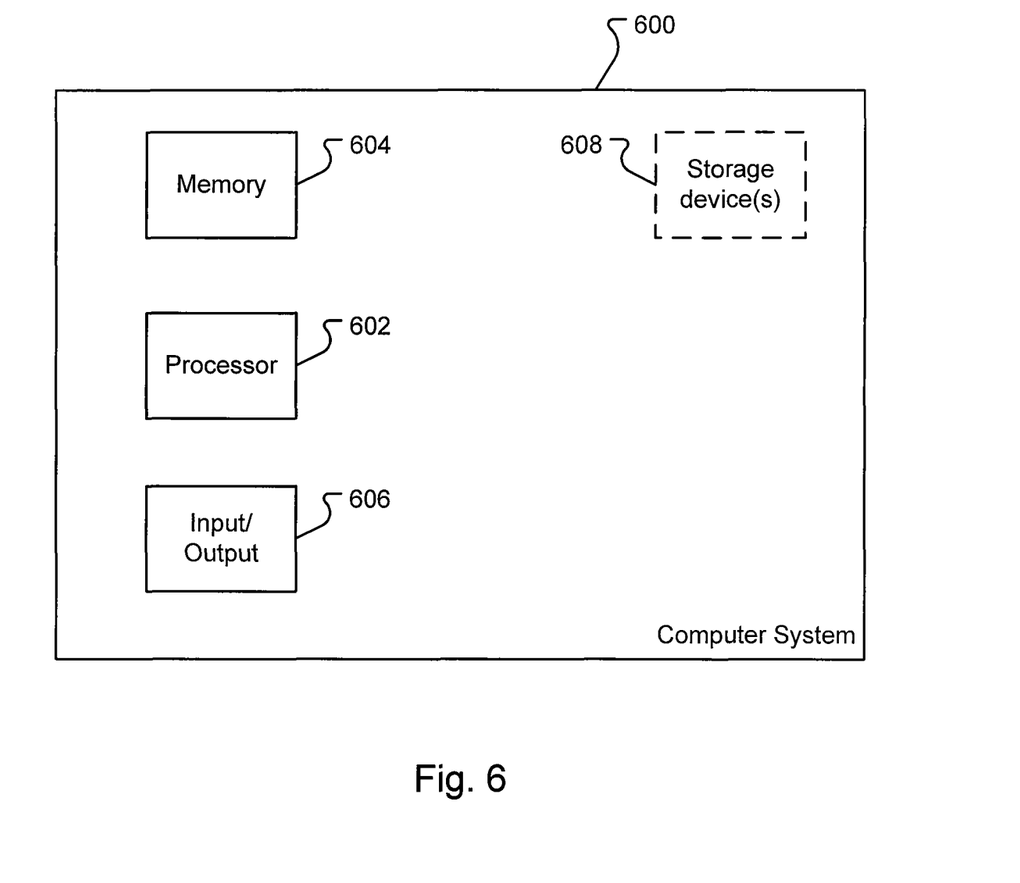
FIG. 6 is a block diagram of an embodiment of a computer system operable as a mobile device comprising a payment user interface device.

The mobile device 202 may also include a storage medium, as explained in conjunction with FIG. 6. The storage medium can include a database or other data store that stores mobile wallet information 216. Mobile wallet information 216 can include one or more items of information for completing a transaction using the NFC component 206. In embodiments, the mobile wallet information 216 comprises a mobile wallet application 214. The mobile wallet application 214 can include software operable to receive and/or translate signals received by the NFC component 206, store, retrieve, and manipulate mobile wallet information 216, translate and/or send information to the NFC component 206 for communication to the NFC sensor application 204.

In operation, the user, in embodiments, initiates a transaction. The mobile device 202 is presented in proximity to the NFC sensor application 204 to complete payment of the transaction using the mobile device 202. However, the NFC component 206 does not complete the transaction automatically. Rather, in embodiments, the user completes an action 212 using a user interface device, such as selecting a payment button 104 (FIG. 1). The action 212 is received by the user interface 210. In embodiments, the user interface 210 signals the processor 208 that the user desires to pay for a transaction using the NFC component 206. The processor 208 activates the switch 218 to power on the NFC component 206. The NFC component 206 then begins communication with the NFC sensor application 204. In embodiments, the processor 208 also executes the mobile wallet application 214 to complete the transaction. In alternative embodiments, the user interface 210 directly activates the switch 218 and sends a signal to the processor 208 to initiate the mobile wallet application 214. The NFC component 206 then completes the transaction and powers off.

Figure 3:
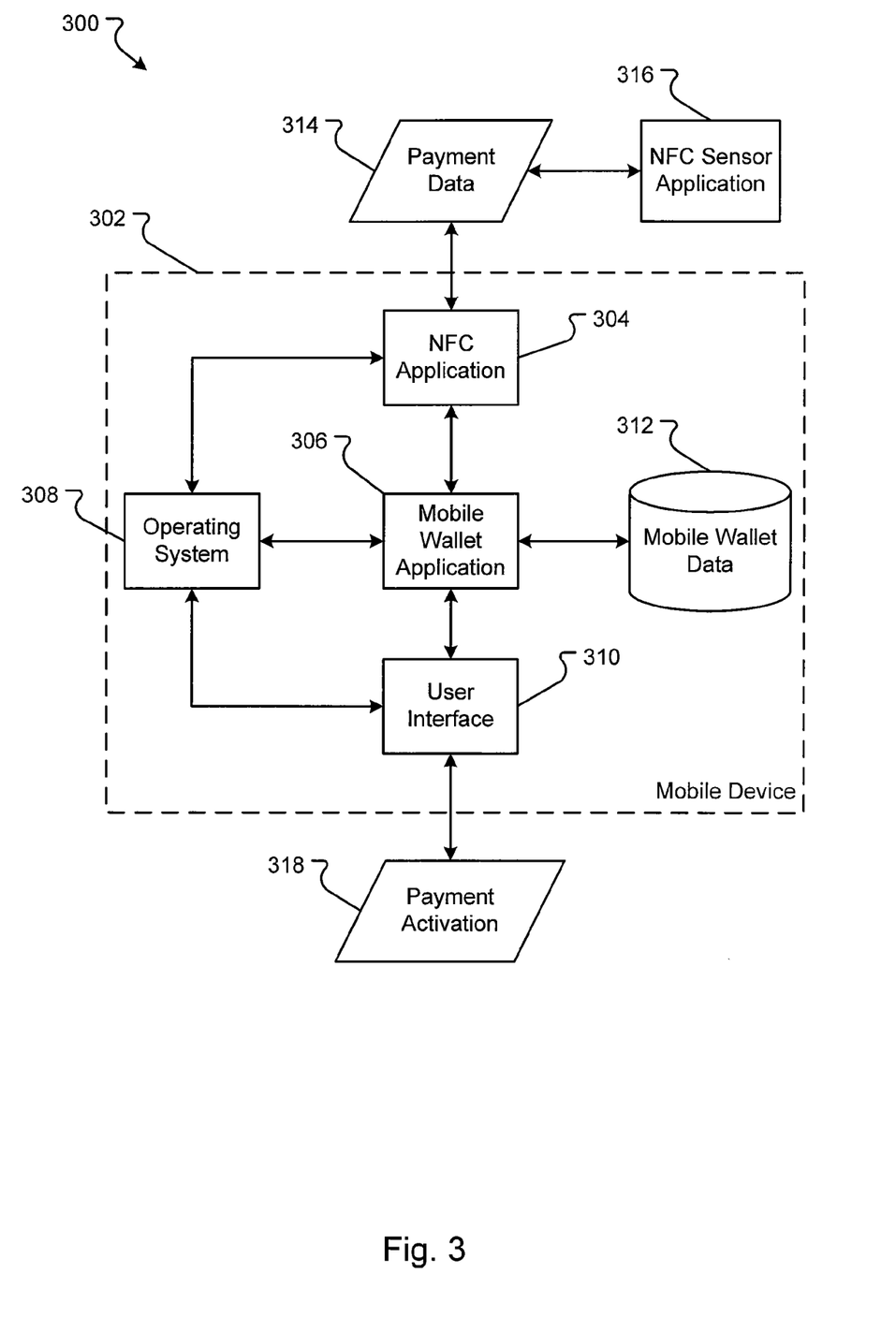
FIG. 3 is a block diagram of an embodiment of a software system for a mobile device comprising a payment user interface device.

An embodiments of a mobile device 302 having one or more components is shown in FIG. 3. In embodiments, the components represent one or more software modules or applications. The one or more software applications may be executed in the processor 208 (FIG. 2), the user interface 210 (FIG. 2), and/or the NFC component 206 (FIG. 2). The mobile device 302, in embodiments, comprises an operating system 308, a mobile wallet application 306, an NFC application 304, a user interface application 310, and/or a database 312.

The user interface 310 can receive signals from the user interface 210 (FIG. 2) and can render displays for the user on the user interface 210 (FIG. 2). In embodiments, the user interface application 310 receives a payment activation signal 318 from the user selecting a user interface device 104 (FIG. 1). The user interface application 310 can recognize the signal as the payment activation signal 318 and send a signal to the operating system 308 that the user wants to complete a payment. In alternative embodiments, the user interface application 310 sends a signal to the mobile wallet application 306 signaling that the user wants to complete a payment. In further embodiments, the mobile wallet application 306 communicates or receives information from the user through the user interface 310.

The operating system 308, in embodiments, is the software that controls one or more other applications and provides access to hardware components. In embodiments, the operating system 308 initializes, instantiates, and/or configures the mobile wallet application 306, the user interface 310, and or the NFC application 304. The operating system 308 can receive a signal from the user interface 310 associated with a payment activation 318. In response to the signal, the operating system 308 can execute the NFC application 304 and/or the mobile wallet application 306. As such, no information can be passed by either the NFC application 304 or the mobile wallet application 306 without the user providing the payment activation 318. In other embodiments, either the NFC application 304 or the mobile wallet application 306 is already active, and the operating system 308 executes the other application.

The NFC application 304 may be any software component or data used to communicate payment data 314 to an NFC sensor application 316. In embodiments, the NFC application 304 executes in a processor or other hardware of the NFC component 206 (FIG. 2). The NFC application 304 may be under the control of the operating system 308. Communication between the NFC application 304 and the mobile wallet application 306 can provide the payment data 314 exchanged between the NFC sensor application 316 and the NFC application 304.

The NFC sensor application 316 can be any software executed in the NFC sensor application 204 (FIG. 2). The NFC sensor application 316 may include one or more software components for exchanging payment data 314 used to complete a transaction with the mobile device 302. In embodiments, the NFC sensor application 316 includes a payment system at a point-of-sale terminal that completes a financial transaction for goods or services.

In embodiments, the mobile wallet application 306 is software that completes the financial transaction with the NFC sensor application 316 through the NFC application 304. The mobile wallet application 306 can store or extract mobile wallet database 312 from a mobile wallet database 312, which may be stored in a storage medium of the mobile device 302. The mobile wallet database 312 can include information about the user (the user's name, address, phone number, email address, etc.), information about payment types for the user (credit card numbers, expiration dates, stored value accounts, gift card numbers, checking account numbers, other account information), security information (passwords, login credentials, etc.), and/or any other information needed to transact business with the NFC sensor application 316. The mobile wallet application 306 can manage the information in the mobile wallet database 312, allowing the user to add, change, and/or delete the data through the user interface 310. Further, the user may need to login to the mobile wallet application 306 by providing information, for example, a login identification and a password, which the mobile wallet application 306 can compare to the information in the mobile wallet database 312.

Figure 4:
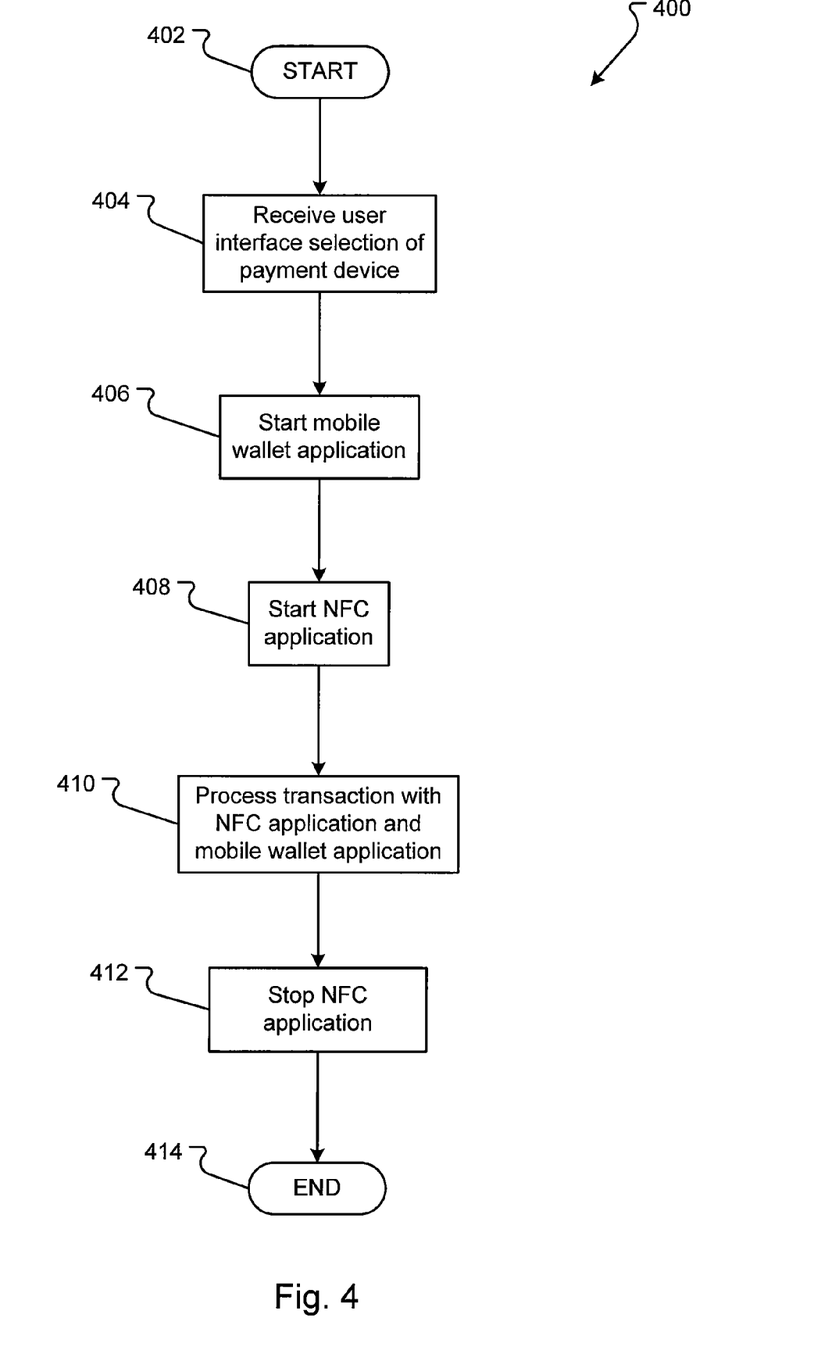
FIG. 4 is a flow diagram of an embodiment of a method for processing a transaction using a mobile device comprising a payment user interface device.

An embodiment of a method 400 for completing a transaction with a mobile device is shown in FIG. 4. In embodiments, the method 400 generally begins with a START operation 402 and terminates with an END operation 414. The steps shown in the method 400 may be executed in a computer system as a set of computer executable instructions. While a logical order is shown in FIG. 4, the steps shown or described can, in some circumstances, be executed in a different order than presented herein.

Receive operation 404 receives a selection of a payment user interface device 104 (FIG. 1). For example, the user selects a payment button 104 (FIG. 1) (whether a physical button or an icon on a touch screen). The user interface component 210 (FIG. 2), in embodiments, receives a signal in response to the user selecting the payment button 104 (FIG. 1). In embodiments, the user interface software 310 (FIG. 3) of the user interface component 210 (FIG. 2) receives the signal and recognizes the signal is for the payment button 104 (FIG. 1).

Start operation 406 starts the mobile wallet application, for example, mobile wallet application 306 (FIG. 3). In embodiments, the user interface application 310 (FIG. 3) sends a signal to the operating system 308 (FIG. 3) that the user desires to complete a payment transaction. The operating system 308 (FIG. 3) initializes and executes the mobile wallet application 306 (FIG. 3). In embodiments, the operating system 308 (FIG. 3) executes in the processor 208 (FIG. 2), which retrieves the mobile wallet application 214 (FIG. 2) from the mobile wallet database 216 (FIG. 2) to start the mobile wallet application 214 (FIG. 2).

Start operation 408 starts the NFC application, for example, NFC application 304 (FIG. 3). In embodiments, the user interface application 310 (FIG. 3) sends a signal to the operating system 308 (FIG. 3) that the user desires to complete a payment transaction. The operating system 308 (FIG. 3) initializes and executes the NFC application 304 (FIG. 3). In embodiments, the operating system 308 (FIG. 3) executes in the processor 208 (FIG. 2). The operating system 308 (FIG. 3) directs the processor 208 (FIG. 2) to send a signal to the switch 218 (FIG. 2) to power on the NFC component 206 (FIG. 2). After the NFC component 206 (FIG. 2) is powered, the operating system 308 (FIG. 3) can initialize and execute the NFC application 304 (FIG. 3). In alternative embodiments, the user interface component 210 (FIG. 2) can send a signal to the switch 218 (FIG. 2) to power on the NFC component 206 (FIG. 2).

Process operation 410 processes the transaction. In embodiments, the NFC component 206 (FIG. 2) interfaces with an NFC sensor application 204 (FIG. 2) after being powered. The NFC sensor application 204 (FIG. 2) can request one or more items of information to complete the transaction, for example, a credit card number or other information from a payment account. The NFC application 304 executing either in the processor 208 (FIG. 2) or in the NFC component 206 (FIG. 2) requests the information from the mobile wallet application 306 (FIG. 3). In embodiments, the mobile wallet application 306 (FIG. 3) retrieves the one or more items of information from the mobile wallet database 312 (FIG. 3). The mobile wallet application 306 (FIG. 3) can send the information back to the NFC application 304 (FIG. 3) for transmission to the NFC sensor application 316 (FIG. 3). After the necessary information is exchanged, the payment transaction is complete.

Stop operation 412 shuts down the NFC application 304 (FIG. 3) and the NFC component 206 (FIG. 2). In embodiments, the operating system 308 (FIG. 3) monitors the transaction to completion. In response to the completed transaction, the operating system 308 (FIG. 3) closes the NFC application 304 (FIG. 3). The operating system 308 (FIG. 3) may then instruct the processor to send one or more bits, bytes, or portions of information to the NFC component 206 (FIG. 2) to erase or write over any information stored in the memory of the NFC component 206 (FIG. 2). For example, the processor 208 (FIG. 2) may make five writes of random 1 and 0 bits to the memory of the NFC component 206 (FIG. 2). In embodiments, after the flushing of the NFC component 206 (FIG. 2) memory, the operating system 208 (FIG. 2) may then send a second signal to the switch 218 (FIG. 2) to power off the NFC component 206 (FIG. 2).

Figure 5:
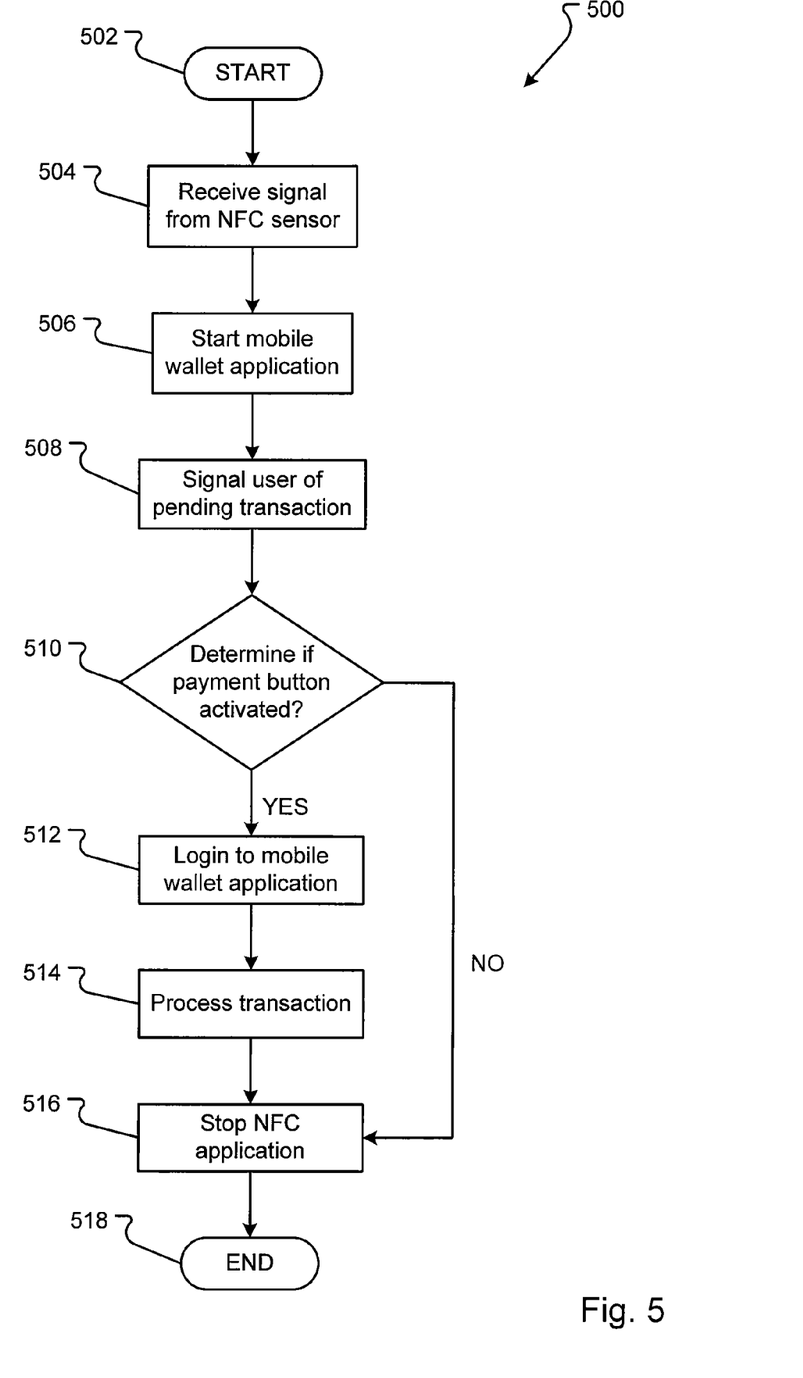
FIG. 5 is a flow diagram of an embodiment of a method for processing a transaction using a mobile device comprising a payment user interface device.

Another embodiment of a method 500 for completing a transaction with a mobile device is shown in FIG. 5. In embodiments, the method 500 generally begins with a START operation 502 and terminates with an END operation 518. The steps shown in the method 500 may be executed in a computer system as a set of computer executable instructions. While a logical order is shown in FIG. 5, the steps shown or described can, in some circumstances, be executed in a different order than presented herein.

Receive operation 504 receives a signal from an NFC sensor, for example, NFC sensor application 204 (FIG. 2). In embodiments, the NFC component 206 (FIG. 2) may be able to recognize an initial signal from the NFC sensor application 204 (FIG. 2) without sending or receiving any information. For example, the NFC component 206 (FIG. 2) may be initially powered by an induction loop powered by the NFC sensor application 204 (FIG. 2).

Start operation 506 starts the mobile wallet application, for example, mobile wallet application 306 (FIG. 3). In embodiments, the operating system 208 (FIG. 2) responds to the initial signal received by the NFC component 206 (FIG. 2) by starting the mobile wallet application 306 (FIG. 3). The mobile wallet application 306 (FIG. 3) may then interface with the user regarding the pending transaction initiated by the NFC component 206 (FIG. 2). However, the NFC application 304 (FIG. 3) may not yet be initialized to prevent the mobile wallet application 306 (FIG. 3) from sending any information to the NFC sensor application 204 (FIG. 2).

Signal operation 508 signals the user of the pending transaction. In embodiments, the mobile wallet application 306 (FIG. 3) sends a signal or information to the user interface application 310 (FIG. 3) to render a display or provide a warning to the user through the user interface 210 (FIG. 2). The user interface 210 (FIG. 2) provides the signal to the user. The mobile device 202 (FIG. 2) then waits for a response for a predetermined period of time. If no response is received, the transaction with the NFC sensor application 204 (FIG. 2) is cancelled.

Determine operation 510 determines if the payment button 104 (FIG. 1) is activated. If the payment button 104 (FIG. 1) is not activated in response to the user interface signal, the method flows NO to stop NFC application 516. If the payment button 104 (FIG. 1) is activated in response to the user interface signal, the method flows YES to login operation 512. In embodiments, the user actuates the payment button 104 (FIG. 1) by selecting the user interface device 104 (FIG. 1). The user interface application 310 (FIG. 3) sends a signal to the operating system 308 (FIG. 3) that the user desires to complete the payment transaction. In embodiments, the operating system 308 (FIG. 3) executes in the processor 208 (FIG. 2) to start the NFC application 304 (FIG. 3).

Login operation 512 logs the user into the mobile wallet application 306 (FIG. 3). Before data is sent to the NFC sensor application 204 (FIG. 2), the user logs into the mobile wallet application 306 (FIG. 3). In embodiments, the user provides security credentials (login name, password, etc.) into the user interface 210 (FIG. 2). The user interface application 310 (FIG. 3) forwards the credentials to the mobile wallet application 306 (FIG. 3). The mobile wallet application 306 (FIG. 3) can compare the credentials with information stored in the mobile wallet database 312 (FIG. 3) to authenticate the user. Thus, activating the payment button 104 (FIG. 1) can initiate a security login.

Process operation 514 processes the transaction. After the activation of the payment button 104 (FIG. 1), the NFC component 206 (FIG. 2) interfaces with an NFC sensor application 204 (FIG. 2). The NFC sensor application 204 (FIG. 2) can request one or more items of information to complete the transaction, for example, a credit card number or other information from a payment account. The NFC application 304 (FIG. 3) executing either in the processor 208 (FIG. 2) or in the NFC component 206 (FIG. 2) requests the information from the mobile wallet application 306 (FIG. 3). In embodiments, the mobile wallet application 306 (FIG. 3) retrieves the one or more items of information from the mobile wallet database 312 (FIG. 3). In embodiments, the mobile wallet application 306 (FIG. 3) may require one or more items of information from the user. The mobile wallet application 306 (FIG. 3) can send information to the user interface application 310 (FIG. 3) to render the requests on a display of the user interface device 210 (FIG. 2). The user may be able to scroll or manipulate the display using the payment button 104 (FIG. 1). In further embodiments, the user may make selections of information in the display of the user interface device 210 (FIG. 2) with the payment button 104 (FIG. 1). As such, the payment button 104 (FIG. 1) functions as a novel and new interface device dedicated to interacting with the mobile wallet application 306 (FIG. 3). The mobile wallet application 306 (FIG. 3) can send the information back to the NFC application 304 (FIG. 3) for transmission to the NFC sensor application 316 (FIG. 3). After the necessary information is exchanged, the payment transaction is complete.

Stop operation 516 shuts down the NFC application 304 (FIG. 3) and the NFC component 206 (FIG. 2). In embodiments, the operating system 308 (FIG. 3) monitors the transaction to completion. In response to the completed transaction, the operating system 308 (FIG. 3) closes the NFC application 304 (FIG. 3). The operating system 308 (FIG. 3) may then instruct the processor to send one or more bits, bytes, or portions of information to the NFC component 206 (FIG. 2) to erase or write over any information stored in the memory of the NFC component 206 (FIG. 2). For example, the processor 208 (FIG. 2) may make five writes of random 1 and 0 bits to the memory of the NFC component 206 (FIG. 2). In embodiments, after the flushing of the NFC component 206 (FIG. 2) memory, the operating system 208 (FIG. 2) may then send a second signal to the switch 218 (FIG. 2) to power off the NFC component 206 (FIG. 2). In other embodiments, the user selects the payment button 104 (FIG. 1) a second time to shut down the NFC application 304 (FIG. 3).

An embodiment of a computer system 600 operable to function as one or more components or systems described herein, such as the mobile device 202 (FIG. 2) is shown in FIG. 6. In embodiments, the computer system 600 comprises a processor 602 for executing one or more instructions in software stored on computer-readable medium, such as memory 604 or storage device(s) 608. The instructions may perform a method, such as methods described in conjunction with FIGS. 4 and 5. The processor 602 may be the same or similar to processor 208 (FIG. 2). The computer system, in embodiments, also includes Input/Output (I/O) devices or components 606. The I/O components 606 can include network interface cards, routers, hardware for communicating with peripherals (e.g., printers, monitors, etc.), software drivers, NFC components, or any other hardware or software needed to receive or send information as described herein.

The computer system 600 can also comprise software elements located within the working memory 604, including an operating system (the same or similar to operating system 308 (FIG. 3)) and/or other code, such as one or more application programs, which may comprise computer programs as described herein, and/or may be designed to implement methods and/or configure systems, as described herein. Merely by way of example, one or more procedures described with respect to the method(s) discussed above might be implemented as code and/or instructions executable by a computer (and/or a processor within a computer).

A set of these instructions and/or code might be stored on a computer-readable storage medium, such as the storage device(s) 608 described above. In some cases, the storage medium might be incorporated within a computer system, such as the database 216 (FIG. 2). In other embodiments, the storage medium might be separate from the computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Figure 7:
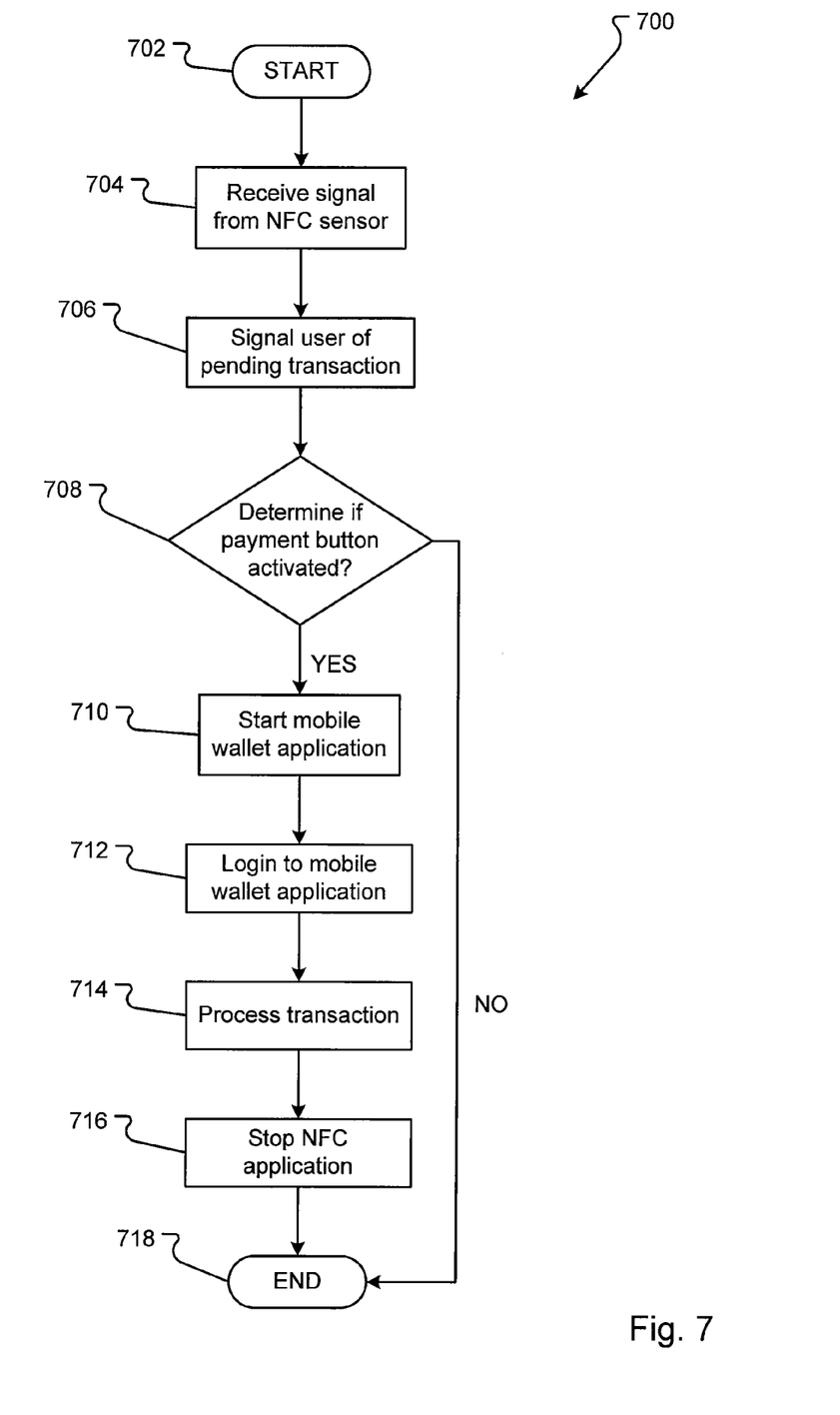
FIG. 7 is a flow diagram of an alternative embodiment of a method for processing a transaction using a mobile device comprising a payment user interface device.

Another embodiment of a method 700 for completing a transaction with a mobile device is shown in FIG. 7. In embodiments, the method 700 generally begins with a START operation 702 and terminates with an END operation 718. The steps shown in the method 700 may be executed in a computer system as a set of computer executable instructions. While a logical order is shown in FIG. 7, the steps shown or described can, in some circumstances, be executed in a different order than presented herein.

Receive operation 704 receives a signal from an NFC sensor, for example, NFC sensor application 204 (FIG. 2). In embodiments, the NFC component 206 (FIG. 2) may be able to recognize an initial signal from the NFC sensor application 204 (FIG. 2) without sending or receiving any information. For example, the NFC component 206 (FIG. 2) may be initially powered by an induction loop powered by the NFC sensor application 204 (FIG. 2).

Signal operation 706 signals the user of the pending transaction. In embodiments, the operating system 308 (FIG. 3) sends a signal or information to the user interface application 310 (FIG. 3) to render a display or provide a warning to the user through the user interface 210 (FIG. 2). The user interface 210 (FIG. 2) provides the signal to the user. The mobile device 202 (FIG. 2) then waits for a response for a predetermined period of time. If no response is received, the transaction with the NFC sensor application 204 (FIG. 2) is cancelled.

Determine operation 708 determines if the payment button 104 (FIG. 1) is activated. If the payment button 104 (FIG. 1) is not activated in response to the user interface signal, the method flows NO to terminate the operation 718. If the payment button 104 (FIG. 1) is activated in response to the user interface signal, the method flows YES to login operation 712. In embodiments, the user actuates the payment button 104 (FIG. 1) by selecting the user interface device 104 (FIG. 1). The user interface application 310 (FIG. 3) sends a signal to the operating system 308 (FIG. 3) that the user desires to complete the payment transaction. In embodiments, the operating system 308 (FIG. 3) executes in the processor 208 (FIG. 2) to start the NFC application 304 (FIG. 3).

In response to the activation of the payment button 104 (FIG. 1), start operation 710 starts the mobile wallet application, for example, mobile wallet application 306 (FIG. 3). In embodiments, the operating system 208 (FIG. 2) responds to the activation of the payment button 104 (FIG. 1) by starting the mobile wallet application 306 (FIG. 3). The mobile wallet application 306 (FIG. 3) may then interface with the user regarding the pending transaction initiated by the NFC component 206 (FIG. 2). However, the NFC application 304 (FIG. 3) may not yet be initialized to prevent the mobile wallet application 306 (FIG. 3) from sending any information to the NFC sensor application 204 (FIG. 2). Having the mobile wallet application 306 initiated only after the activation of the payment button 104 (FIG. 1), prevents any payment data from being transferred but allows non-payment NFC communication to continue. Further, someone trying to access mobile payment data without authorization is prevented access without action by the user.

Login operation 712 logs the user into the mobile wallet application 306 (FIG. 3). Before data is sent to the NFC sensor application 204 (FIG. 2), the user logs into the mobile wallet application 306 (FIG. 3). In embodiments, the user provides security credentials (login name, password, etc.) into the user interface 210 (FIG. 2). The user interface application 310 (FIG. 3) forwards the credentials to the mobile wallet application 306 (FIG. 3). The mobile wallet application 306 (FIG. 3) can compare the credentials with information stored in the mobile wallet database 312 (FIG. 3) to authenticate the user. Thus, activating the payment button 104 (FIG. 1) can initiate a security login.

Process operation 714 processes the transaction. After the activation of the payment button 104 (FIG. 1), the NFC component 206 (FIG. 2) interfaces with an NFC sensor application 204 (FIG. 2). The NFC sensor application 204 (FIG. 2) can request one or more items of information to complete the transaction, for example, a credit card number or other information from a payment account. The NFC application 304 (FIG. 3) executing either in the processor 208 (FIG. 2) or in the NFC component 206 (FIG. 2) requests the information from the mobile wallet application 306 (FIG. 3). In embodiments, the mobile wallet application 306 (FIG. 3) retrieves the one or more items of information from the mobile wallet database 312 (FIG. 3). In embodiments, the mobile wallet application 306 (FIG. 3) may require one or more items of information from the user. The mobile wallet application 306 (FIG. 3) can send information to the user interface application 310 (FIG. 3) to render the requests on a display of the user interface device 210 (FIG. 2). The user may be able to scroll or manipulate the display using the payment button 104 (FIG. 1). In further embodiments, the user may make selections of information in the display of the user interface device 210 (FIG. 2) with the payment button 104 (FIG. 1). As such, the payment button 104 (FIG. 1) functions as a novel and new interface device dedicated to interacting with the mobile wallet application 306 (FIG. 3). The mobile wallet application 306 (FIG. 3) can send the information back to the NFC application 304 (FIG. 3) for transmission to the NFC sensor application 316 (FIG. 3). After the necessary information is exchanged, the payment transaction is complete.

Stop operation 716 shuts down the NFC application 304 (FIG. 3) and the NFC component 206 (FIG. 2). In embodiments, the operating system 308 (FIG. 3) monitors the transaction to completion. In response to the completed transaction, the operating system 308 (FIG. 3) closes the NFC application 304 (FIG. 3). The operating system 308 (FIG. 3) may then instruct the processor to send one or more bits, bytes, or portions of information to the NFC component 206 (FIG. 2) to erase or write over any information stored in the memory of the NFC component 206 (FIG. 2). For example, the processor 208 (FIG. 2) may make five writes of random 1 and 0 bits to the memory of the NFC component 206 (FIG. 2). In embodiments, after the flushing of the NFC component 206 (FIG. 2) memory, the operating system 208 (FIG. 2) may then send a second signal to the switch 218 (FIG. 2) to power off the NFC component 206 (FIG. 2). In other embodiments, the user selects the payment button 104 (FIG. 1) a second time to shut down the NFC application 304 (FIG. 3).

While various aspects of embodiments of the disclosure have been summarized above, the following detailed description illustrates exemplary embodiments in further detail to enable one of skill in the art to practice the disclosure. In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form. Several embodiments of the disclosure are described below, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Specific details are given in the above description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) 600 may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

In light of the above description, a number of advantages of the present disclosure are readily apparent. For example, the mobile device 202 (FIG. 2) is functionally unable to transfer sensitive payment or user data to an NFC sensor application 204 (FIG. 2) without activation of the payment button 104 (FIG. 1). In one embodiment, the NFC communication chip or component 206 (FIG. 2) of the mobile device 202 (FIG. 2) is not powered without activation of the payment button 104 (FIG. 1). In other embodiments, one or more of the mobile wallet application 306 (FIG. 3) or the NFC application 304 (FIG. 3) may not be active without activation of the payment button 104 (FIG. 1). Further, the user may be required to login to the mobile wallet application 306 (FIG. 3) after selecting the payment button 104 (FIG. 1). One skilled in the art will recognize that the order of how components are powered or applications are started is interchangeable. Further, one or more interventions may be available to impede the communication of the NFC component 206 (FIG. 2) before the activation of the payment button 104 (FIG. 1). Regardless, the user regains control over the function of the NFC component 206 (FIG. 2) with the payment button 104 (FIG. 1).

A number of variations and modifications of the disclosure can also be used. For example, a payment button may also be placed on the NFC sensor application 204 (FIG. 2). As such, only after both payment buttons are activated will a transaction occur. This modification will further protect the user as any signal from an NFC source will be ignored and transactions will only occur after deliberate effort by the consumer. Further, the mobile device may contain a separate payment system (including a separate processor, memory, etc.). The entire system may be powered off until the user activates the payment button 104 (FIG. 1). Thus, there would be no means of inadvertently sending sensitive information with the mobile wallet application 306 (FIG. 3).

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. While the principles of the disclosure have been described above in connection with specific apparatuses and methods, it is to be clearly understood that this description is made only by way of example and not as limitation on the scope of the disclosure.

What is claimed is:

1. A method for processing a financial transaction with a mobile device, the method comprising:
    utilizing a mobile device to conduct the financial transaction, wherein the mobile device comprises a payment user interface, a cellular processor to permit the mobile device to communicate over a cellular network, the cellular processor in communication with the user interface, and a near field communication (NFC) component in communication with the cellular processor that permits the mobile device to communicate with an NFC sensor separate from the cellular network, wherein the NFC component communicates with the NFC sensor for transmitting account payment information when the mobile device is in proximity to the NFC sensor and the NFC component is powered on, and wherein the NFC component does not communicate with the NFC sensor for transmitting the account payment information when the NFC component is powered off;
    the cellular processor receiving a selection signal, wherein the selection signal indicates the user desires to complete the transaction using the NFC component;
    in response to the selection signal, actuating a mobile wallet application resident on the mobile device in order to obtain the account payment information used to pay for the transaction;
    producing a display on a display screen of the mobile device requesting approval of the transaction;
    receiving an input approving the transaction;
    the mobile wallet application requesting payment account information from a NFC application resident on the mobile device, the NFC application actuating the NFC component, wherein the NFC component comprises a device that is activated to enable it to communicate by an activation switch that provides power to the NFC component;
    the NFC component obtaining the account payment information from memory in the mobile phone;
    the NFC application transmitting the account payment information; and
    following transmitting of the account payment information, the cellular processor powering off the NFC component to prevent the NFC component from communicating with any NFC sensors.

2. The method as described in claim 1, further comprising exchanging one or more items of sensitive information between the NFC component and the NFC sensor.

3. The method as described in claim 1, wherein shutting down the NFC component further comprises:
    flushing the memory of the NFC component.

4. The method as described in claim 1, further comprising:
    starting the mobile wallet application, wherein the mobile wallet application completes the transaction with an NFC sensor application executed on the NFC sensor; and
    starting the NFC application, the NFC application operable to communicate information from the mobile wallet application to the NFC sensor.

5. The method as described in claim 4, wherein the mobile wallet application retrieves the one or more items of sensitive information from a mobile wallet datastore.

6. The method as described in claim 1, further comprising receiving security credentials from the user before completing the transaction.

7. A mobile device comprising:
    a cellular processor that is configured to permit the mobile device to communicate over a cellular phone network;
    an NFC component in communication with the processor, the NFC component operable to communicate one or more items of sensitive information to an NFC sensor to complete a transaction separate from the cellular phone network;
    wherein the NFC component communicates with the NFC sensor for transmitting the sensitive information when the mobile device is in proximity to the NFC sensor and the NFC component is powered on, and wherein the NFC component does not communicate with the NFC sensor for transmitting the sensitive information when the NFC component is powered off;

a user interface in communication with the processor, the user interface comprising a payment user interface device, the user interface operable to send a signal to the processor indicating the payment user interface device was selected by a user; and a switch in communication with the processor and the NFC component, the switch operable to provide power to the NFC component when activated by the processor;

a mobile wallet application resident on the mobile device;

a NFC application resident on the mobile device;

wherein the mobile wallet application is configured to produce a display on a display screen of the mobile device requesting approval of a transaction, to receive an input approving the transaction, and to request payment account information from the NFC application;

wherein the NFC application actuates the NFC component to enable it to communicate after receiving the request for payment account information from the mobile wallet application, the NFC component obtaining the account payment information from memory in the mobile phone, the NFC application transmitting the account payment information;

wherein the processor is configured to power off the NFC component following completion of the transaction to prevent the NFC component from communicating with any NFC sensors.

8. The mobile device as described in claim 7, wherein the NFC component is powered off until the switch is activated.

9. The mobile device as described in claim 7, further comprising a mobile wallet database, wherein the mobile wallet application retrieves the one or more items of sensitive information from the mobile wallet database and sends the one or more items of sensitive information to the NFC component to communicate the one or more items of sensitive information to the NFC sensor to complete the transaction.

10. The mobile device as described in claim 7, wherein the user selects the payment user interface device to provide a selection to the user interface and the user interface operable to send the selection to the mobile wallet application.

11. The mobile device as described in claim 7, wherein the user interface sends a second signal to the switch to power on the NFC component.

* * * * *